United States Patent [19]

Sulzberg et al.

[11] 4,395,504

[45] Jul. 26, 1983

[54] ADHESIVE SYSTEM FOR PARTICLEBOARD MANUFACTURE

[75] Inventors: Theodore Sulzberg, Highland Park; Chi Ma, Parsippany, both of N.J.

[73] Assignee: Sun Chemical Corporation, New York, N.Y.

[21] Appl. No.: 415,143

[22] Filed: Sep. 7, 1982

[51] Int. Cl.³ .................... B32B 21/02; C08G 12/12; C08L 1/00
[52] U.S. Cl. .................................. 524/14; 428/407; 428/528; 428/537; 524/597; 528/245; 528/367
[58] Field of Search ............... 528/245, 367; 428/528, 428/407, 537; 524/14, 597

[56] References Cited

U.S. PATENT DOCUMENTS

| Re. 30,442 | 12/1980 | Moore | 528/245 |
| 2,532,983 | 12/1950 | Alderson | 428/258 |
| 4,215,172 | 6/1980 | Pearson | 428/528 |
| 4,345,063 | 8/1982 | North | 528/245 |

FOREIGN PATENT DOCUMENTS 2019854A 11/1979 United Kingdom .

Primary Examiner—Ellis P. Robinson
Attorney, Agent, or Firm—Cynthia Berlow

[57] ABSTRACT

A formaldehyde-free adhesive system for the manufacture of particleboard comprises the reaction product of a cyclic urea and glyoxal in an equivalent ratio of about 1.1–1.5:1.

5 Claims, No Drawings

ADHESIVE SYSTEM FOR PARTICLEBOARD MANUFACTURE

BACKGROUND OF THE INVENTION

Particleboard is the term used for products manufactured from lignocellulosic materials, usually wood, primarily in the form of discrete pieces or particles, combined with a synthetic resin and bonded together under heat and pressure. It may be made by either a wet process or a dry process.

It is widely used in the furniture trade where it can be used for cores over which are bonded fine veneers, decorative plastics, or other materials. It is also used in mobile homes, floor underlayments, decking, sheathing, wainscoting, baseboards, and the like.

Although there are hundreds of species of wood in a variety of sizes and shapes that have been used in the production of particleboard, only three types of resin have been used; namely, urea-formaldehyde, phenol-formaldehyde, and isocyanates.

Because of environmental problems and OSHA restrictions, it is necessary to find replacements for the formaldehyde-containing adhesive systems. The presence of even less than one percent of free formaldehyde, based on the total weight of the product, is undesirable, not only because of its unpleasant odor, but also because it is an allergen and an irritant, causing severe reactions in the operators who manufacture the adhesive system and who prepare and handle the particleboard and in persons who handle articles fabricated from the particleboard. In addition, because of their very dark colors, phenol-formaldehyde resins are not always suitable for decorative applications. The isocyanate systems have the disadvantages of high cost and the need for special handling because of their toxicity.

A typical resin for use in the manufacture of particleboard has a pH between about 6.8 and 7.8, a Brookfield viscosity between about 1.80 and 3.50 poises, and a solids content of about 65 percent in water. In addition, it has a storage stability of two weeks at 40° C. with less than a doubling in viscosity.

SUMMARY OF THE INVENTION

The reaction product of a cyclic urea and glyoxal in an equivalent ratio of about 1.1–1.5:1 meets all the requirements for an adhesive system for the manufacture of particleboard and, additionally, contains no free or bonded formaldehyde.

DETAILED DESCRIPTION OF THE INVENTION

The reaction of a cyclic urea with glyoxal at an equivalent ratio of about 1.1–1.5:1 forms resins that are useful in the manufacture of particleboard.

The cyclic ureas which may be used have the following general formulas:

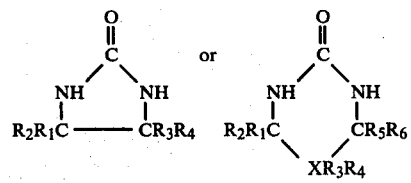

wherein $R_1$, $R_2$, $R_3$, $R_4$, $R_5$, and $R_6$ may be the same or different and each may be H, OH, COOH, R, OR, or COOR wherein R is an alkyl or a substituted alkyl group having 1 to 4 carbon atoms, and X may be C, O, or N; when X is O, $R_3$ and $R_4$ are each zero; when X is N, $R_3$ or $R_4$ is zero.

Typical examples of such compounds include, but are not limited to, ethylene urea, propylene urea, uron, tetrahydro-5-(2-hydroxyethyl)-1,3,5-triazin-2-one, 4,5-dihydroxy-2-imidazolidinone, 4,5-dimethoxy-2-imidazolidinone, 4-methyl ethylene urea, 4-ethyl ethylene urea, 4-hydroxyethyl ethylene urea, 4,5-dimethyl ethylene urea, 4-hydroxy-5-methyl propylene urea, 4-methoxy-5-methyl propylene urea, 4-hydroxy-5, 5-dimethyl propylene urea, 4-methoxy-5,5-dimethyl propylene urea, tetrahydro-5-(ethyl)- 1,3,5-triazin-2-one, tetrahydro-5-(propyl)-1,3,5-triazin-2-one, tetrahydro-5-(butyl)-1,3,5-triazin-2-one, and the like, and mixtures of these.

The condensates can be prepared by any suitable and convenient procedure. The cyclic urea, preferably ethylene urea, and the glyoxal are generally reacted in a ratio of cyclic urea: glyoxal of about 1.1–1.5:1 and preferably at a ratio of about 1.2–1.4:1, with the ratio of 1.3:1 being most preferred. The reaction may be carried out within the temperature range of room temperature up to reflux, but preferably it is run at about 50° to 60° C. for about two hours. The pH may range from about 2 to 8, and preferably is within the range of about 5 to 8. The product is a water-soluble oligomer.

The product of the reaction of ethylene urea and glyoxal has the general structure

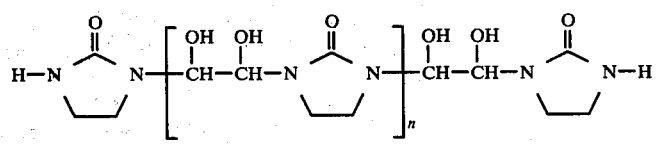

where n is 1–8 and preferably 2–3.

Particleboard is generally manufactured by suspending wood fibers in water and metering the fiber slurry onto a continuously moving screen. The water drains away through the screen, leaving a damp mat of interlaced fibers. A resin adhesive system and other additives are applied to the mat, and the treated mat is then pressed into its final density in a hot press. During the pressing step the fibers are bonded and the resin is cured.

Catalysts are usually used to achieve better bonding and shorter press times. The type and amount of catalyst depend upon the choice of resin, the intended end use, the type of wood particles used, and even the season. Typical catalysts include ammonium sulfate, ammonium chloride, cupric chloride, and their mixtures; they are used in amounts of about 1 to 4 percent, and preferably about 1.5 to 2.5 percent, based on the resin.

The dry resin is generally used in an amount of about 4 to 10 percent, and preferably about 6 to 8 percent, based on the wood fibers.

The initial water content of the pre-pressed mat is usually about 7 to 15 percent, dropping to about 6 to 8 percent, based on the fiber/resin.

Press times vary between about 3 to 8 minutes at 280° to 380° F. at pressures of 100 to 800 psi.

The following examples illustrate but do not limit this invention. Unless otherwise specified, all parts and percentages are by weight.

EXAMPLE 1

A. 238 Parts (3.3 equivalents) of a 40% aqueous solution of glyoxal was added at room temperature to a vessel containing 184 parts (4.3 equivalents) of ethylene urea, and the pH of the solution immediately adjusted to 7.5 with sodium hydroxide solution. The temperature was then raised to 55°±3° C. and held for one hour with the pH being held at 7.5. The pH of the reaction mixture was then adjusted to 6.5 with 20% aqueous sulfuric acid, and the mixture was held for 1½ hours at 55° C. The pH was then raised to 7 with 25% sodium hydroxide solution. 28 Parts of water was added; the mixture was held at 55° C. for 15 minutes, the pH readjusted to 7.0, and the mixture cooled to room temperature.

The product was a clear, pale yellow, odorless liquid. The solution contained 65% solids and had a pH of 7.0. Its Brookfield viscosity was 1.8 poises.

B. To determine the stability of the product, a portion was stored for 10 days at room temperature, at which time the viscosity had risen to 2.1 poises and the pH had dropped to 6.8.

Another portion was kept in an oven at 42° C. for four days, at which time the viscosity had risen to 3.6 poises and the pH had dropped to 5.3. These stability data are excellent for a reactive resin for use in particleboard systems.

To determine curing speed, the resin and 0.5–4.0% of catalyst in a test tube was set in a bath of boiling water; the resin was agitated rapidly for 1 minute with a small rod to bring the resin up to the temperature of the bath. The time it took for the resin to gel was read. The cure time of the resin product of part (A) at 100° C. with 1% p-toluene sulfonic acid was 50 seconds.

When for comparative purposes the same test was carried out using a standard urea-formaldehyde resin, virtually identical results were obtained.

C. Particleboard was prepared using the resin of part (A) by the following procedure which simulates results obtained during plant manufacture:

100 parts of oven-dried (10% moisture) Douglas fir particles were sprayed in a rotating drum blender with 12 parts of a mixture containing 95 percent of the resin solution product of part (A), 1.7 percent of cuprous chloride dihydrate, and 3.3 percent of ammonium chloride. The resin-treated particles were placed in a 4"×6" mold heated to 300° F. and pressed at 550 psi for 6 minutes to give a ¼-inch thick board.

The typical adhesive bond strength (internal bond) was found to be 60 psi.

EXAMPLE 2

A. In a manner identical to the procedure described in Example 1, 238 parts (3.3 equivalents) of a glyoxal solution (40% in water) and 177 parts (4.13 equivalents) of ethylene urea were reacted to give a 62 percent solution in water which had a Brookfield viscosity of 5.8 poises and a pH of 7.1.

B. In a like manner as in Example 1, it was found that after 2 weeks at room temperature the viscosity was still 5.8 poises.

After 3 days at 45° C., another portion had a decreased viscosity of 2.3 poises. At the end of 12 days, the viscosity had risen to 5.0 poises.

The curing times of a series of catalyzed resins were determined and a value of 40 seconds was found, using 1 percent p-toluenesulfonic acid.

C. Particleboards were prepared using the conditions set forth above, and the internal board strength was found to be 72 psi.

EXAMPLE 3

The procedure of Example 1 was repeated except that the following ratios of ethylene urea:glyoxal were used instead of 1.3:1 as in part (A): 1.1:1 and 1.5:1. The results were comparable.

EXAMPLE 4

For purposes of comparison, several experiments were carried out. In each the procedure of Example 1 was repeated except for the following:

(a) the equivalent ratio of ethylene urea:glyoxal was 1:1 (as in the Japanese Publication No. 5 3044-576) instead of 1.3:1 as in Example 1;

(b) the equivalent ratio of ethylene urea:glyoxal was 0.5:1 (as in the Japanese Publication) instead of 1.3:1 as in Example 1;

(c) The ethylene urea:glyoxal condensation product of Example 1 was reacted with sufficient methanol to completely alkylate the material.

None of the above products was a satisfactory resin adhesive for particleboard. Products (a) and (b) failed because the resins were too high in viscosity and could not be used at the solids level necesssary to give the appropriate level of adhesion between particles of wood. Products (b) and (c) failed because little reaction occurred in a time suitable for preparing particleboard systems at a reasonable cost.

What is claimed is:

1. In a particleboard that comprises particles of wood and a formaldehyde-free resin adhesive system, the improvement wherein the resin adhesive system comprises the product of the reaction of a cyclic urea and glyoxal in the equivalent ratio of about 1.1–1.5:1.

2. A formaldehye-free resin adhesive system for particleboard which comprises a cyclic urea:glyoxal condensate wherein the equivalent ratio of the cyclic urea:glyoxal is about 1.1–1.5.

3. The condensate of claim 2 wherein the cyclic urea is ethylene urea.

4. The condensate of claim 2 wherein the equivalent ratio of cyclic urea:glyoxal is about 1.2–1.4:1.

5. The condensate of claim 2 wherein the equivalent ratio of cyclic urea:glyoxal is 1.3:1.

* * * * *

UNITED STATES PATENT AND TRADEMARK OFFICE
CERTIFICATE OF CORRECTION

PATENT NO. : 4,395,504
DATED : July 26, 1983
INVENTOR(S) : Theodore Sulzberg and Chi Ma It is certified that error appears in the above-identified patent and that said Letters Patent are hereby corrected as shown below:

Claim 2, column 4, line 58, after "1.5" insert -- ;1 --

Signed and Sealed this

Seventh Day of August 1984

[SEAL]

Attest:

GERALD J. MOSSINGHOFF

Attesting Officer — Commissioner of Patents and Trademarks